United States Patent [19]

Brihier

[11] Patent Number: 4,593,564

[45] Date of Patent: Jun. 10, 1986

[54] EQUILIBRATING APPARATUS IN PARTICULAR FOR MOTOR VEHICLE WHEELS

[75] Inventor: Gerard C. C. Brihier, Arpajon, France

[73] Assignee: FACOM, Morangis, France

[21] Appl. No.: 583,635

[22] Filed: Feb. 27, 1984

[30] Foreign Application Priority Data

Feb. 28, 1983 [FR] France ................... 83 03272

[51] Int. Cl.$^4$ ............................................. G01M 1/16
[52] U.S. Cl. ................................... 73/473; 73/477
[58] Field of Search .......................... 73/471–479

[56] References Cited

U.S. PATENT DOCUMENTS

| 2,344,753 | 3/1944 | Van Degrift | 73/473 |
| 2,817,972 | 12/1957 | Bokorney | 73/471 |
| 4,352,291 | 10/1982 | Curchod et al. | 73/477 |

FOREIGN PATENT DOCUMENTS 1238240  4/1967  Fed. Rep. of Germany ........ 73/471

*Primary Examiner*—Stewart J. Levy
*Assistant Examiner*—John E. Chapman, Jr.
*Attorney, Agent, or Firm*—Wenderoth, Lind & Ponack

[57] ABSTRACT

In this equilibrating apparatus, the shaft 19 supporting the face-plate 20 for receiving the wheel is rotatively mounted in bearings 18 which are mounted in annular end parts 16, 17 of a tubular body 13. The median part 15 of the latter is fixed to the frame 11, 12 of the apparatus and connected to the end parts by resiliently deformable devices 25, 26 which are deformable in a direction located in a measuring plane which is an axial plane of the shaft and of the tubular body. Measuring detectors are fixed on the resiliently deformable devices 25, 26. The arrangement eliminates any parasitic force which is liable to have a disadvantageous effect on the measurement and consequently permits the use of a simple gear drive for the shaft.

16 Claims, 12 Drawing Figures

EQUILIBRATING APPARATUS IN PARTICULAR FOR MOTOR VEHICLE WHEELS

The present invention relates to the equilibration of rotating bodies such as vehicle wheels and more particularly to the wheel equilibrating apparatus of the type comprising a shaft rotatably mounted in bearings which are fixed to a frame by resiliently yieldable means, the shaft being coupled to driving means whereby it may reach sufficient velocity for the equilibration or balancing of a wheel fixed to one of its ends, force measuring detectors being mounted on the resiliently yieldable means so as to measure the imbalance of the rotating body which is to be corrected.

FIG. 1 of the accompanying drawings shows diagrammatically and in perspective a known equilibrating apparatus of this type which comprises a frame 1 on which are fixed bearings 2 by means of resiliently deformable means 3. The aligned bearings receive a shaft 4 which is rotatably mounted therein and has an end 5 on which a faceplate (not shown) for fixing a wheel to be equilibrated is secured. This shaft is driven in rotation by a transmission comprising a driven pulley 6, a toothed belt 7 and a driving pulley 8, the latter being driven by an electric motor 9 connected to the frame 1. Detectors 10 such as stress gauges are connected to the resiliently deformable means or strips 3 for measuring the deformations when the shaft and the wheel are driven in rotation. If the wheel has an imbalance, the latter can be consequently measured and then corrected by an equilibrating or balancing weight in the manner well known in the art.

In order to ensure that slight variations in the velocity of rotation of the shaft 4 do not affect the result of the measurement by contributing to a certain extent to the deformation of the strips 3, it is preferable to employ a belt transmission since, under these conditions, it is possible to employ a driven pulley of large diameter with which the belt can engage at a large angle. In this way, the engagement between the belt and the pulley occurs on a large number of teeth so that it is possible to reduce considerably the parasitic variations in the velocity of the shaft However, a belt transmission does not permit the use of large speed reducing ratios for an overall size of the equilibrating apparatus which is compatible with normal practice. It is hardly possible to exceed the ratio 3, so that the electric driving motor must have a comparatively low speed of rotation and hence a relatively high power. For example, in an equilibrating apparatus of the type shown in FIG. 1, this power must be of the order of 600 Watts.

The irregularities in the torque and speed of the shaft disturb the measurement of the imbalance owing to the fact that the resiliently yieldable strips may become deformed as a result of the oscillating movements of the bearings in planes which are perpendicular to the axis of the shaft 4. On the other hand, in the axial direction, the strips 3 are practically undeformable and consequently no axial disturbance can affect the measurement.

Now, it would be desirable for reasons of overall size and cost to eliminate the drive by means of pulleys or sprockets and a belt and to replace it by, for example, a gear pinion and gear wheel drive. However, a gear pinion drives the gear wheel (keyed on the shaft) only through one tooth at a time so that there is a considerable oscillation of the speed of rotation of the shaft produced by the passage from one tooth to the other in the course of the rotation of the pinion and wheel. Owing to the direct influence of this oscillation on the result of the measurement, such a transmission has not been employed in the past although its low cost could considerably reduce the cost of the whole of the equilibrating apparatus.

An object of the invention is therefore to provide an equilibrating apparatus which overcomes the drawbacks of the prior art and which permits, on one hand, practically completely eliminating the parasitic influences on the measurement of the imbalance and, on the other hand (and consequently), using a simple and cheap transmission between the driving motor and the shaft.

The invention therefore provides an equilibrating apparatus of the type defined hereinbefore, wherein said resiliently deformable means are disposed axially relative to the shaft and have longitudinal axes of symmetry which are located roughly in the same axial plane as the shaft defining a measuring plane in which these resiliently deformable means have the lowest stiffness while they have a very high stiffness in an axial plane perpendicular to said measuring plane, and the measuring detectors are connected to the resiliently deformable means in such manner that their direction of maximum sensitivity coincides with said measuring plane, so that any disturbance in a direction contained in the axial plane perpendicular to the measuring plane is eliminated.

A more precise measurement results from these features.

According to an advantageous feature of the invention, a gear pinion and gear wheel transmission is provided between the driving motor and the shaft.

This very advantageous feature permits not only reducing the cost of the equilibrating apparatus owing to the elimination of a transmission having a toothed belt, but also reducing the power of the driving motor whose speed of rotation may be chosen at a comparatively high value.

A better understanding of the invention will be had from the following description of embodiments of the invention with reference to the accompanying drawings.

In the drawings:

FIGS. 2 to 5 show a first embodiment of the invention which will now be described in detail.

Figure 1:
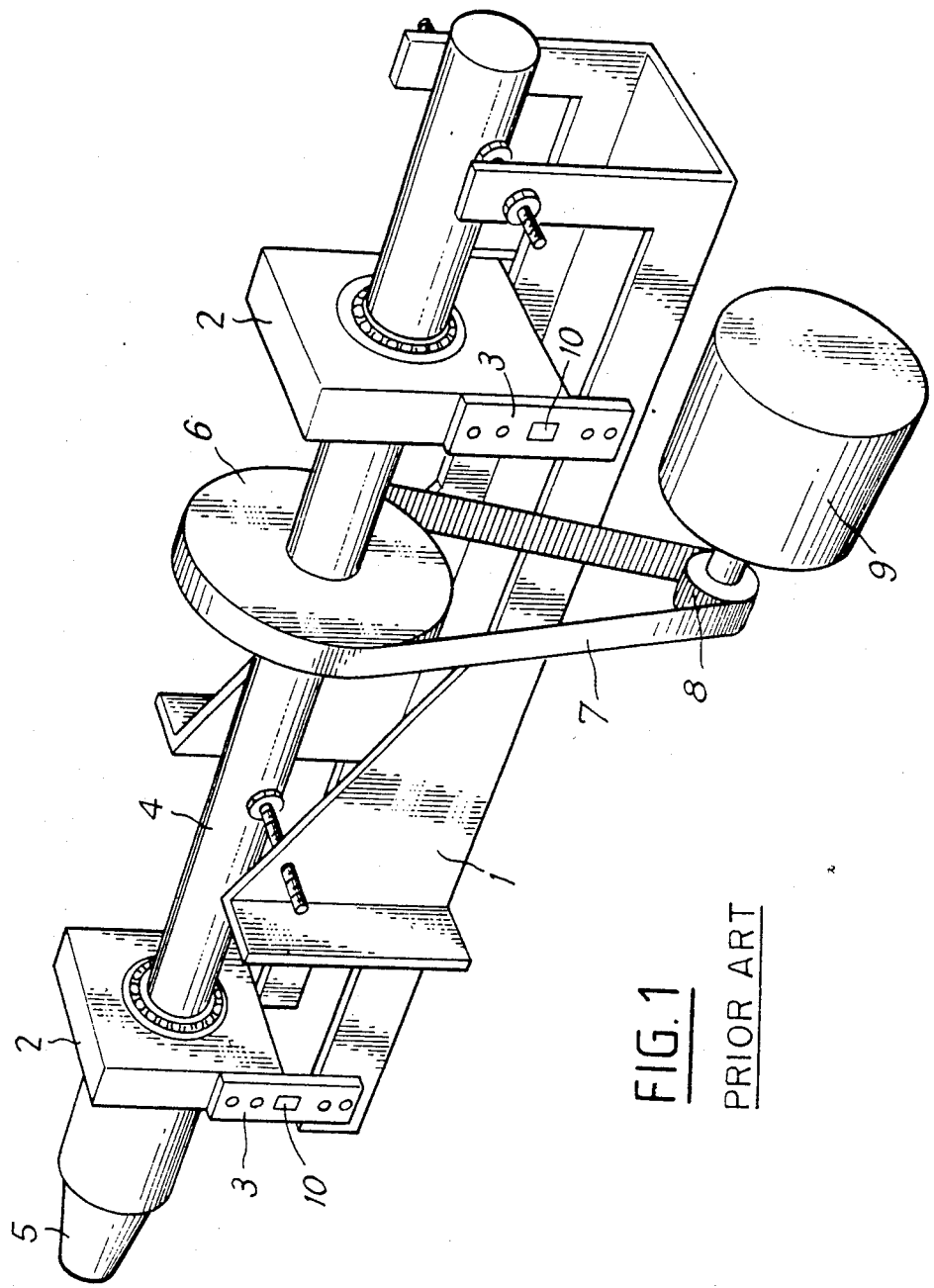
FIG. 1 is a perspective view of a wheel equilibrating apparatus according to the prior art.
Figure 2:
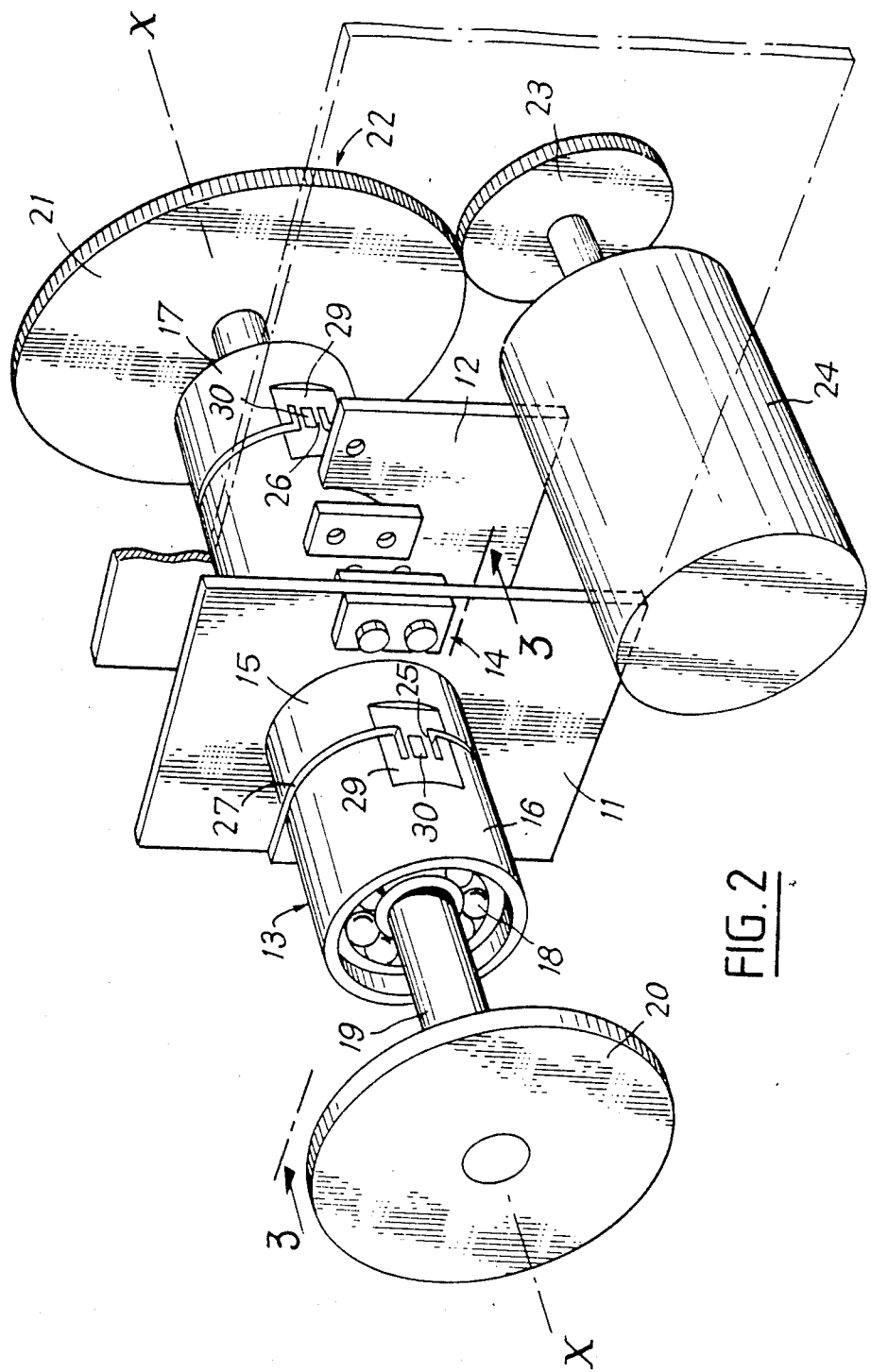
FIG. 2 is a diagrammatic perspective view of an equilibrating apparatus according to the invention.

The equilibrating apparatus or balancer according to the invention comprises a frame having, as shown in FIG. 2, two vertical mounting plates 11 and 12 in which a tubular body or support tube 13 is rigidly fixed by fixing devices 14, the support tube being here of circular cross-sectional shape with its axis X—X oriented horizontally. Note that the invention is not intended to be limited to a circular cross-sectional shape of the support tube.

The support tube has a middle part 15 and two end parts 16 and 17 adapted to receive bearings 18 which serve to mount rotatably a spindle or shaft 19 which is consequently rotatable about its horizontal axis relative to the plates 11 and 12 of the frame. The axis of the spindle 19 coincides with the axis X—X of the support tube 13. A face-plate 20 adapted to receive a wheel to be equilibrated or balanced is fixed to one of the ends of the spindle. It may have any known construction and is not part of the invention.

At the opposite end of the spindle there is a gear wheel 21 of a transmission 22 which includes a simple gear pinion 23 engaged with the wheel 21. This pinion is keyed on the output shaft of a driving motor 24 fixed to one of the plates 11.

Figure 5:
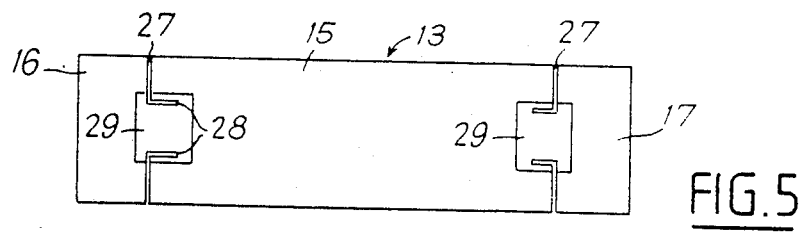
FIG. 5 is an elevational view to another scale of the outside of the support tube.

As can be seen in particular in FIG. 5, the tube 13 is made in a single piece while the middle part 15 fixed to the frame is only connected to each respective end part 16 or 17 by a pair of diametrically opposed connecting lugs 25 or 26 each of which forms one of the resiliently deformable means of the suspension of the spindle 19. Thus each part 16 or 17 is connected to the frame 11, 12 by respective connecting means comprising the middle part 15 and the respective resiliently deformable pair of lugs 25 or 26.

Preferably, these connecting lugs or resiliently deformable means are formed in the tube by slots constituting two diametrically opposed radial incisions 27 in radial planes of the tube and two axial incisions 28 which extend in a direction parallel to the axis of the tube and whose length corresponds to the desired length of the connecting lugs. Thus the latter have a certain circumferential extent and are disposed in diametrically opposed positions as clearly shown in FIG. 3. Further, a flat surface 29 is provided in the region of each connecting lug for adjusting the resilience of each lug by a judicious choice of the milling depth and also for easily mounting on this lug a measuring gauge 30.

Figure 3:
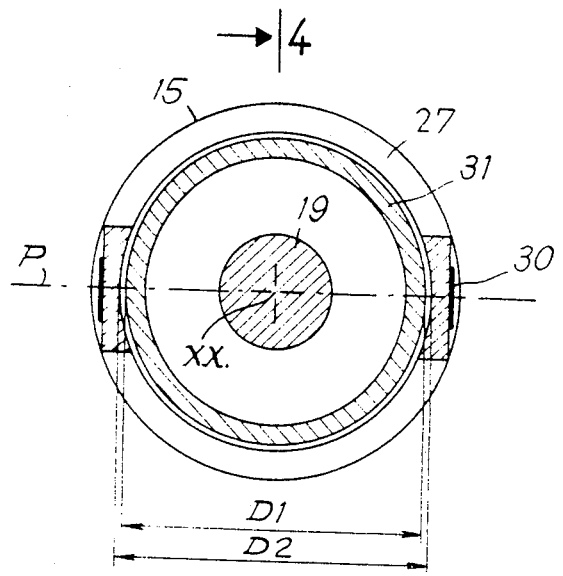
FIG. 3 is a radial sectional view to an enlarged scale and taken on line 3—3 of FIG. 2.

FIG. 3 shows that the connecting lugs are each symmetrical relative to a plane which is the measuring plane and contains the axis X—X of the spindle 19.

Figure 4:
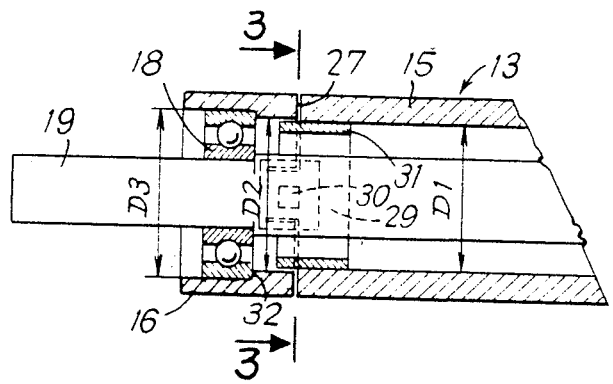
FIG. 4 is an axial sectional view to a reduced scale relative to FIG. 3 of a part of the shaft supporting tube.

FIG. 4 shows that the inside diameter of the tube 13 is not constant. Thus the bore of the middle part 15 has a diameter D1 in which is a drive fit the outside diameter of a stop ring 31 which is inserted in this bore but extends beyond the end part 16 or 17. Note that the two ends of the tube 13 may have the same arrangement, although the end of the support tube close to the gear wheel 21 is less exposed to deterioration due to blows against the face-plate 20.

Each end portion 16 and 17 has a portion of a diameter D2 which is larger than the diameter D1 and an end portion of diameter D3 so that D1<D2<D3. A radial shoulder 32 is thus formed in the end portion 16 or 17 for acting as a support surface for the corresponding bearing 18.

Owing to the fact that the inner portion of diameter D2 partly surrounds the stop ring 31, the amplitude of a movement of oscillation of an end part 16 or 17 relative to the middle part 15 is limited to a value which avoids exceeding the elastic limit of the connecting lugs 25 and 26.

The connecting lugs 25 and 26 have low stiffness in a direction contained in the measuring plane (P) and high stiffness which opposes any deformation in a direction perpendicular to this plane (P) and this all the more so that their angular extent is greater. Consequently, any stress in the direction perpendicular to the measuring plane (P) is eliminated and becomes negligible in the region of the measuring gauges 30. The latter are secured to the connecting lugs in such manner that their preferential direction of sensitivity is contained in the measuring plane and that any disturbance whose direction is oriented perpendicularly to the measuring plane is rejected. The result of the measurement of the imbalance of the object to be equilibrated will therefore be devoid of parasitic influences.

As described hereinbefore, it then becomes possible to employ a simple gear train as the transmission 22 between the motor 24 and the spindle 19 which allows the use of a large speed-reduction ratio and a motor running at high speed. By way of example, there may be employed a motor of 120 W running at 1,500 rpm and driving the spindle at a speed of 200 to 300 rpm.

Figure 6:
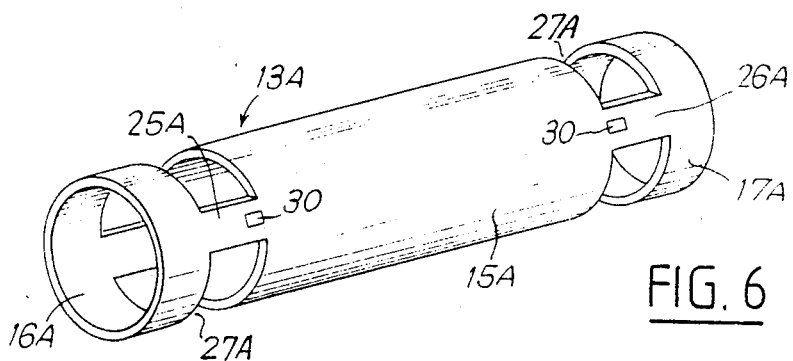
FIGS. 6 and 7 are diagrammatic perspective views of two modifications of the support tube.
Figure 7:
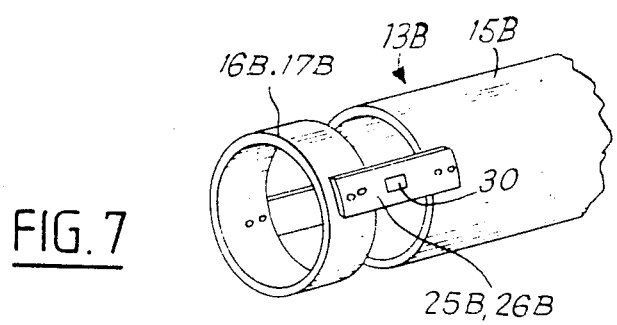

FIG. 6 shows a first modification of the support tube. The latter indicated by the reference character 13A has a middle part 15A, end parts 16A and 17A and connecting lugs 25A and 26A receiving the measuring gauges 30. In this modification, the connecting lugs are respectively formed by two notches 27A having an axial extent equal to that of the connecting lugs 25A and 26A. While the tubes 13 and 13A of FIGS. 5 and 6 are in one piece, it is possible to employ a composite support tube 13B such as shown in FIG. 7. In this case, a fixed middle part 15B and two end parts 16B (and 17B not shown in the drawing) are provided, the end parts being connected to the middle part 15B by added connecting lugs 25B (and 26B). These connecting lugs constitute, here again, resiliently deformable means and support the measuring gauges 30.

FIGS. 8 to 11 show four possible modifications (which are not exhaustive) of the safety stop means protecting the suspension of the spindle against blows. In these modifications, the support tube is made in a single piece as in FIG. 5 and has perpendicular incisions 27 and 28 particular to the embodiment.

Figure 8:
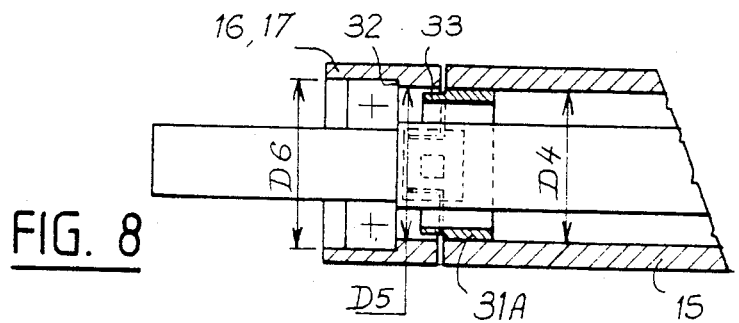
FIGS. 8 to 11 are sectional views similar to those of FIG. 4 of four other possible modifications of the invention.

In FIG. 8, the bore of the middle part 15 of the support tube has an inside diameter D4 equal to that of an inner portion of the end part 16 or 17, the latter having moreover an end portion whose inside diameter D6 is larger than the diameters D4 and D5. In this modification, a stepped stop ring 31A is provided and is a drive fit in the bore of the middle part 15 but extends beyond the latter in the form of a flange 33 whose diameter is less than the diameter D4 of the bore.

Figure 9:
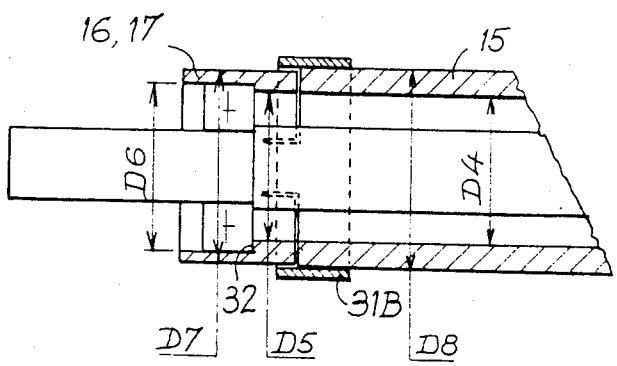

In the modification shown in FIG. 9, there is provided a stop ring 31B which has a uniform inside diameter but is a drive fit on the outside diameter of the middle part 15 of the support tube 13. In order to allow a certain freedom of oscillation to the end parts 16 and 17, their outside diameter D7 is slightly smaller than the diameter D8 of the middle part 15. The inside diameters of the support tube are here identical to those shown in FIG. 8.

Figure 10:
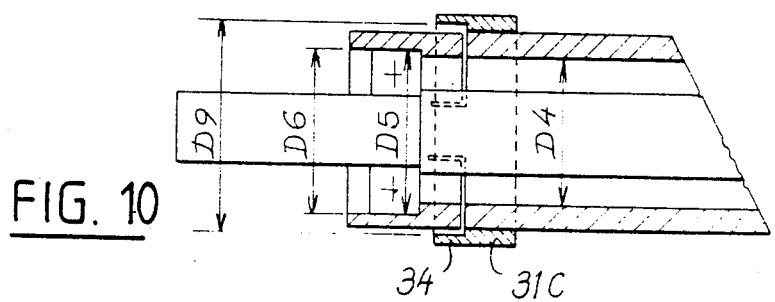

In the modification shown in FIG. 10, there is also provided an outer stop ring 31C which is a drive fit on the middle part 15 of the support tube and has a projecting flange 34 whose diameter D9 exceeds the uniform diameter of the support tube 13.

Figure 11:
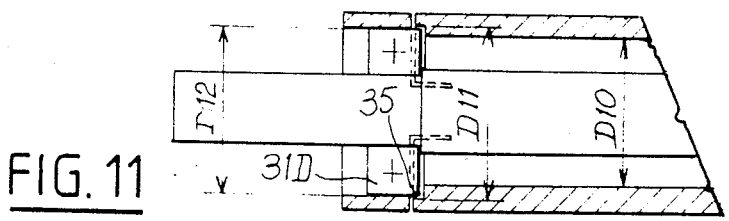

In the modification shown in FIG. 11, it is the bearing 18 which performs the function of a stop ring 31D. In this case, a recess of diameter D11 formed by an annular groove 35 is formed in the region of junction between the middle part 15 and the end part 16 or 17. The diameter D11 is greater than the diameter D12 of the end parts and the diameter D12 is greater than the inside diameter D10 of the middle part 15.

Figure 12:
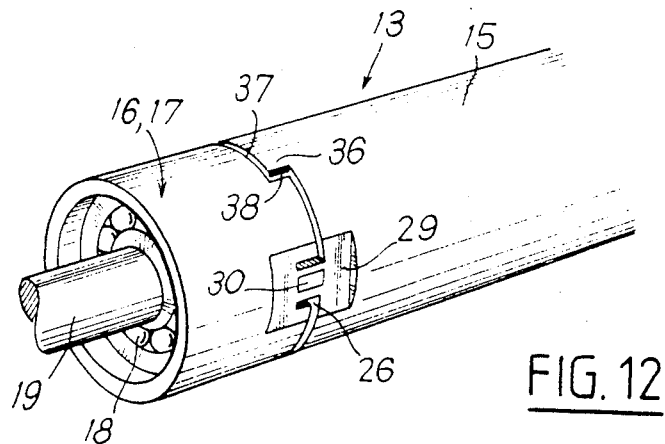
FIG. 12 is a partial perspective view of another modification of the support tube.

The modification shown in FIG. 12 has stop means for protecting against blows which is formed in the support tube itself. For this purpose, at the interface between the middle part 15 and the end part 16 or 17, there is provided in the slot 27 a U configuration which defines a tongue portion 36 in the middle part which projects into a notch 37 formed in the end part. The axially extending edges 38 of this tongue portion and of the notch thus constitute stop or abutment surfaces performing the same function as the stop rings described hereinbefore. It will be understood that assemblies of a tongue portion and a notch may be provided in diametrically opposed portions which are offset angularly 90° relative to the connecting lugs which are contained in the axial measuring plane.

In all the modifications described hereinbefore, there is provided a measuring gauge per resiliently yieldable means. However, it may be sufficient to provide only a single gauge per pair of connecting lugs, ie one for measuring the imbalance in the exterior plane of a vehicle wheel, and the other for the interior plane, since no compensation is required between diametrically opposed gauges owing to the identical deformation in the connecting lugs of each pair 25 or 26.

With the arrangement of the bearings in the same support tube, the alignment of these bearings may be very precise and thus eliminate a detect which is usually encountered in conventional equilibrating apparatus.

What is claimed is:

1. An equilibrating apparatus for a body adapted to be driven in rotation such as a vehicle wheel, said apparatus comprising a frame, a shaft having an axis of rotation, two bearings in which the shaft is mounted, connecting means for connecting respective said bearings to the frame, said connecting means comprising a pair of resiliently deformable means for connecting each respective bearing to said frame, driving means drivingly connected to the shaft for rotating the shaft at sufficient speed for the equilibration of said body when the body is fixed to an end of the shaft, force measuring detectors fixed to each resiliently deformable means for measuring the imbalance of said body, each pair of said resiliently deformable means extending in a direction parallel to said axis of the shaft and being symmetrical relative to a measuring plane containing said axis of the shaft and in diametrically opposed respective positions relative to said axis of the shaft, each of said resiliently deformable means having a low stiffness in a direction substantially parallel to said measuring plane and a high stiffness in a direction substantially perpendicular to said measuring plane, and said measuring detectors having maximum sensitivity in a direction parallel to said measuring plane so as to permit the elimination of any disturbing force in a direction perpendicular to said measuring plane.

2. An equilibrating apparatus according to claim 1, comprising two annular elements in which said two bearings are respectively mounted, said pairs of resiliently deformable means comprising pairs of connecting lugs located between said frame and said annular elements.

3. An equilibrating apparatus according to claim 2, wherein said annular elements are in one piece with said connecting lugs.

4. An equilibrating apparatus according to claim 3, comprising a middle tubular element connected to the frame, said annular elements and said connecting lugs being in one piece with the middle tubular element.

5. An equilibrating apparatus according to claim 4, wherein said annular elements and said middle tubular element constitute a tubular body which has a circular cross-sectional shape and an axis coinciding with the axis of said shaft.

6. An equilibrating apparatus according to claim 2, wherein said connecting means are attached to the frame and to said annular elements 7. An equilibrating apparatus according to claim 5, wherein said tubular body defines pairs of parallel flat surfaces in regions where the diametrically opposed connecting lugs are located.

8. An equilibrating apparatus according to claim 5, wherein each annular element is separated from the middle element by two diametrically opposed slots substantially in a plane perpendicular to said axis of the shaft each of which slots is connected to two slots substantially in a plane containing said axis of the shaft and respectively defining lateral corresponding edges of each pair of diametrically opposed connecting lugs.

9. An equilibrating apparatus according to claim 7, wherein each end annular element is separated from the middle element by two diametrically opposed slots substantially in a plane perpendicular to said axis of the shaft each of which slots is connected to two slots substantially in a plane containing said axis of the shaft and respectively defining lateral corresponding edges of each pair of diametrically opposed connecting lugs.

10. An equilibrating apparatus according to claim 5, wherein each of said connecting lugs is defined in said tubular body by two slots having a length in a direction parallel to the axis of said tubular body which corresponds to the length of the connecting lugs.

11. An equilibrating apparatus according to claim 7, wherein each of said connecting lugs is defined by two peripheral cut-away portions having a length in a direction parallel to the axis of said tubular body which corresponds to the length of the connecting lugs.

12. An equilibrating apparatus according to claim 5, comprising stop means for maintaining the deformation of each pair of said connecting lugs within their elastic deformation limit.

13. An equilibrating apparatus according to claim 12, wherein said stop means is a ring mounted to said tubular body and overlapping a gap between said middle element and said annular elements.

14. An equilibrating apparatus according to claim 12, wherein said stop means is defined by the bearing and an abutment surface on the middle tubular element.

15. An equilibrating apparatus according to claim 12, wherein the end annular elements are separated from the middle element by two diametrically opposed first slots substantially in a plane perpendicular to said axis of the shaft each of which slots is connected to two second slots substantially in a plane containing said axis of the shaft and respectively defining lateral corresponding edges of each pair of diametrically opposed connecting lugs, each of said first slots having a U-shaped part defining a tongue portion which extends axially of the tubular body into a complementary notch respectively provided at a junction between the middle element of the tubular body and the respective end annular element and said U-shaped part of said first slot being angularly offset 90° relative to said corresponding connecting lugs so as to define said stop means.

16. An equilibrating apparatus according to claim 1, wherein said driving means comprise a gear train.

* * * * *